United States Patent
Dowlatkhah et al.

(10) Patent No.: US 10,271,170 B2
(45) Date of Patent: *Apr. 23, 2019

(54) DETERMINATION OF LOCATION OF A MOBILE DEVICE

(71) Applicant: AT&T Intellectual Property I, L.P., Atlanta, GA (US)

(72) Inventors: Sangar Dowlatkhah, Alpharetta, GA (US); Venson Shaw, Kirkland, WA (US)

(73) Assignee: AT&T INTELLECTUAL PROPERTY I, L.P., Atlanta, GA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/901,661

(22) Filed: Feb. 21, 2018

(65) Prior Publication Data

US 2018/0184249 A1 Jun. 28, 2018

Related U.S. Application Data

(63) Continuation of application No. 14/817,800, filed on Aug. 4, 2015, now Pat. No. 9,942,710.

(51) Int. Cl.
*H04W 24/00* (2009.01)
*H04W 4/02* (2018.01)
(Continued)

(52) U.S. Cl.
CPC .......... *H04W 4/023* (2013.01); *G06Q 50/265* (2013.01); *H04L 63/102* (2013.01);
(Continued)

(58) Field of Classification Search
CPC .................................................... H04W 4/023
(Continued)

(56) References Cited

U.S. PATENT DOCUMENTS 5,905,461 A 5/1999 Neher
6,226,622 B1 5/2001 Dabbiere
(Continued)

FOREIGN PATENT DOCUMENTS

CA 2770069 A1 2/2011
WO 03060847 A1 7/2003
(Continued)

OTHER PUBLICATIONS

SPOT Trace® Services, Spot Ready for Adventure, findmespot.com, http://findmespot.com/en/index.php?cid=129, last accessed Mar. 12, 2015.
(Continued)

*Primary Examiner* — Charles T Shedrick
(74) *Attorney, Agent, or Firm* — Amin, Turocy & Watson, LLP

(57) ABSTRACT

Determination of a current location of a mobile device based on exchange of messages between the mobile device and a remote device. The determination can be originated from the remote device and can be performed, in certain embodiments, by a system within a network that provides services to the mobile device. The location of the mobile device can be determined without reliance on a dedicated location service module (e.g., software or firmware) at the user equipment. The system can utilize signals from a global navigation satellite system or signals time-of-flight terrestrial signals emitted and/or received at the mobile device. In addition, the system can provide location information associated with the mobile device in response to a prompt from the remote device in instances in which the remote device is authorized to receive location information. An authorized remote device can be or can include a device associated with the user equipment or a third-party device.

20 Claims, 8 Drawing Sheets

(51) Int. Cl.
| | |
|---|---|
| *H04W 4/12* | (2009.01) |
| *G06Q 50/26* | (2012.01) |
| *H04W 76/50* | (2018.01) |
| *H04L 29/06* | (2006.01) |
| *H04W 12/08* | (2009.01) |
| *H04W 4/90* | (2018.01) |

(52) U.S. Cl.
CPC .............. *H04W 4/12* (2013.01); *H04W 4/90* (2018.02); *H04W 12/08* (2013.01); *H04W 76/50* (2018.02)

(58) Field of Classification Search
USPC .......................................... 455/456.2, 456.3
See application file for complete search history.

(56) References Cited

U.S. PATENT DOCUMENTS

| | | |
|---|---|---|
| 6,300,875 B1 | 10/2001 | Schafer |
| 6,356,841 B1 | 3/2002 | Hamrick et al. |
| 6,388,612 B1 | 5/2002 | Neher |
| 6,720,879 B2 | 4/2004 | Edwards |
| 6,813,498 B1 | 11/2004 | Durga et al. |
| 6,957,217 B2 | 10/2005 | Raverdy et al. |
| 7,099,921 B1 | 8/2006 | Engstrom et al. |
| 7,203,502 B2 | 4/2007 | Wilson et al. |
| 7,253,731 B2 | 8/2007 | Joao |
| 7,259,668 B2 | 8/2007 | Casey |
| 7,379,743 B2 | 5/2008 | Bostrom et al. |
| 7,492,251 B1 | 2/2009 | Katz |
| 7,551,126 B2 | 6/2009 | Loomis et al. |
| 7,602,302 B2 | 10/2009 | Hokuf et al. |
| 7,728,724 B1 | 6/2010 | Scalisi et al. |
| 7,830,305 B2 | 11/2010 | Boling et al. |
| 7,990,264 B2 | 8/2011 | Chou |
| 8,035,510 B2 | 10/2011 | Pfafman et al. |
| 8,073,467 B2 | 12/2011 | Gupta et al. |
| 8,290,513 B2 | 10/2012 | Forstall et al. |
| 8,301,158 B1 | 10/2012 | Thomas |
| 8,315,905 B1 | 11/2012 | Adair |
| 8,364,170 B2 | 1/2013 | Lohtia et al. |
| 8,442,807 B2 | 5/2013 | Ramachandran |
| 8,446,272 B2 | 5/2013 | Raduchel |
| 8,447,325 B2 | 5/2013 | Anakata et al. |
| 8,514,058 B2 | 8/2013 | Cameron |
| 8,531,294 B2 | 9/2013 | Slavin et al. |
| 8,558,694 B2 | 10/2013 | Brandt et al. |
| 8,565,735 B2 | 10/2013 | Wohlwend et al. |
| 8,589,488 B2 | 11/2013 | Huston et al. |
| 8,606,612 B2 | 12/2013 | de Silva et al. |
| 8,644,847 B1 | 2/2014 | Nelissen et al. |
| 8,686,852 B2 | 4/2014 | Ben-Dayan et al. |
| 8,700,659 B2 | 4/2014 | Skeen et al. |
| 8,725,165 B2 | 5/2014 | Lau et al. |
| 8,761,797 B1 | 6/2014 | Norton |
| 8,768,375 B2 | 7/2014 | Farmer |
| 8,825,084 B2 | 9/2014 | Hymel et al. |
| 8,831,577 B2 | 9/2014 | Ginn et al. |
| 8,838,566 B2 | 9/2014 | Vaananen |
| 8,849,310 B2 | 9/2014 | Fan et al. |
| 8,886,584 B1 | 11/2014 | Kane, Jr. et al. |
| 8,924,250 B2 | 12/2014 | Bates et al. |
| 8,989,773 B2 | 3/2015 | Sandel et al. |
| 9,456,298 B2 | 9/2016 | Lee et al. |
| 2003/0114171 A1 | 6/2003 | Miyamoto |
| 2004/0185875 A1 | 9/2004 | Diacakis et al. |
| 2007/0146199 A1 | 6/2007 | Huang et al. |
| 2007/0214073 A1 | 9/2007 | Smith |
| 2008/0032703 A1 | 2/2008 | Krumm et al. |
| 2008/0153511 A1 | 6/2008 | Mock |
| 2008/0262717 A1 | 10/2008 | Ettinger |
| 2009/0315704 A1 | 12/2009 | Rosing |
| 2010/0217525 A1 | 8/2010 | King et al. |
| 2011/0053605 A1 | 3/2011 | Carpio et al. |
| 2011/0083101 A1 | 4/2011 | Sharon et al. |
| 2011/0105143 A1 | 5/2011 | Harple et al. |
| 2011/0207440 A1 | 8/2011 | Ruuspakka et al. |
| 2011/0234399 A1 | 9/2011 | Yon |
| 2011/0238476 A1 | 9/2011 | Carr et al. |
| 2011/0258049 A1 | 10/2011 | Ramer et al. |
| 2011/0295677 A1 | 12/2011 | Dhingra et al. |
| 2012/0233067 A1 | 9/2012 | Matthew et al. |
| 2012/0265841 A1 | 10/2012 | Ross et al. |
| 2012/0271684 A1 | 10/2012 | Shutter |
| 2012/0284100 A1 | 11/2012 | Goldberg |
| 2012/0290336 A1 | 11/2012 | Rosenblatt et al. |
| 2013/0013412 A1 | 1/2013 | Altman et al. |
| 2013/0060640 A1 | 3/2013 | Gadhia et al. |
| 2013/0090980 A1 | 4/2013 | Hummel |
| 2013/0304578 A1 | 11/2013 | Kannan et al. |
| 2013/0332527 A1 | 12/2013 | Du et al. |
| 2014/0006069 A1 | 1/2014 | Guggenheim |
| 2014/0019248 A1 | 1/2014 | Stoliartchouk et al. |
| 2014/0046802 A1 | 2/2014 | Hosein et al. |
| 2014/0074604 A1 | 3/2014 | Castillo et al. |
| 2014/0094195 A1 | 4/2014 | Luo et al. |
| 2014/0122040 A1 | 5/2014 | Marti |
| 2014/0171024 A1 | 6/2014 | Huang et al. |
| 2014/0213295 A1 | 6/2014 | Conklin |
| 2014/0222562 A1 | 8/2014 | Akgul et al. |
| 2014/0279014 A1 | 9/2014 | Roka et al. |

FOREIGN PATENT DOCUMENTS

| | | |
|---|---|---|
| WO | 2007004999 A1 | 1/2007 |
| WO | 2012148657 A1 | 11/2012 |

OTHER PUBLICATIONS

IOS 7: Understanding Location Services, Apple, support.apple.com, https://support.apple.com/en-us/HT201357, last accessed Mar. 12, 2015.
GPS, Broadcom, broadcom.com, http://www.broadcom.com/products/GPS, last accessed Mar. 12, 2015.
Enable Android location access, Google, support.google.com, https://support.google.com/coordinate/answer/2569281?hl=en, last accessed Mar. 12, 2015.
About T-Mobile, T-Mobile, t-mobole.com, http://www.t-mobile.com/company/privacyresources.aspx?tp=Abt_Tab_LocationServices, last accessed Mar. 12, 2015.
Emergency Beacons, NOAA: Search and rescue satellite aided tracking, sarsat.noaaa.govhttp://www.sarsat.noaa.gov/emerbcns.html, last accessed Mar. 12, 2015.
Outlander Real-Time GPS Tracker, Spyguy Security, www.spyguysecurity.com, http://www.spyguysecurity.com/collections/gps-tracking/products/outlander-portable-real-time-gps-tracker, last accessed Mar. 12, 2015.
GPS Tracker: Micro Tracker, Spy Spot Investigation, shop.spy-spot.com, http://shop.spy-spolcom/gps-tracker, last accessed Mar. 12, 2015.
The only choice to protect your business assets, Lightning GPS, lightninggps.com, http://www.lightninggps.com/gps_asset_tracking/, last accessed Mar. 12, 2015.
Steinfeld, Charles. "The development of location based services in mobile commerce." E-Life after the Dot Com Bust. Physica-Verlag HD, 2004. 177-197. http://link.springer.com/chapter/10.10071978-3-662-11659-3_10.
Free Trend Report: Why Location is the New Currency of Marketing. ScreenMedia Daily, screenmediadaily.com, http://screenmediadaily.com/free-trend-report-why-location-is-the-new-currencyof-marketing/ last accessed Mar. 14, 2015.
Georgiev et al., "Where Businesses Thrive: Predicting the Impact of the Olympic Games on Local Retailers through Location-based Services Data." arXiv preprint arXiv:1403.7654, 2014.
Dilmener et al., "Location Based Sales Promotion Strategies," International Conference on Marketing & Consumer Behavior, 2013.
Office Action dated Dec. 28, 2016 for U.S. Appl. No. 14/817,800, 27 pages.

(56) References Cited

OTHER PUBLICATIONS

Office Action dated Jun. 14, 2017 for U.S. Appl. No. 14/817,800, 15 pages.
Office Action dated Dec. 26, 2017 for U.S. Appl. No. 14/817,859, 40 pages.
Office Action dated Mar. 19, 2018 for U.S. Appl. No. 14/824,746, 30 pages.
Office Action dated Apr. 30, 2018 for U.S. Appl. No. 14/817,859, 32 pages.
Office Action dated Aug. 24, 2018 for U.S. Appl. No. 14/824,746, 84 pages.
Office Action dated Oct. 3, 2018 for U.S. Appl. No. 14/817,859, 30 pages.

DETERMINATION OF LOCATION OF A MOBILE DEVICE

RELATED APPLICATION

The subject application is a continuation of, and claims priority to, U.S. patent application Ser. No. 14/817,800 (now U.S. Pat. No. 9,942,710), filed Aug. 4, 2015, and entitled "DETERMINATION OF LOCATION OF A MOBILE DEVICE," the entirety of which application is hereby incorporated by reference herein.

TECHNICAL FIELD

The subject application relates to determination of location of a mobile device based on, for example, exchange of messages between the mobile device and a remote device.

BACKGROUND

Applications for location services for mobile devices, such as a smartphone, have exploded in recent years. Determination of location of a smartphone typically relies on a software module and a receiver of global navigation system (GPS) signals that is embedded in the smartphone. The software module can be specific to the operating system of the smartphone and is typically executed in the background, at essentially all times when enabled, in order to provide an estimate of a current location of the smartphone. Therefore, in instances in which the smartphone has been restarted, the software module may no longer be executed in the background, as it may be the case with certain operating systems. In such a scenario, the software module usually fails to determine a current location of the smartphone. Accordingly, the overall design of conventional location technologies leaves much to be improved.

DETAILED DESCRIPTION

Figure 1:
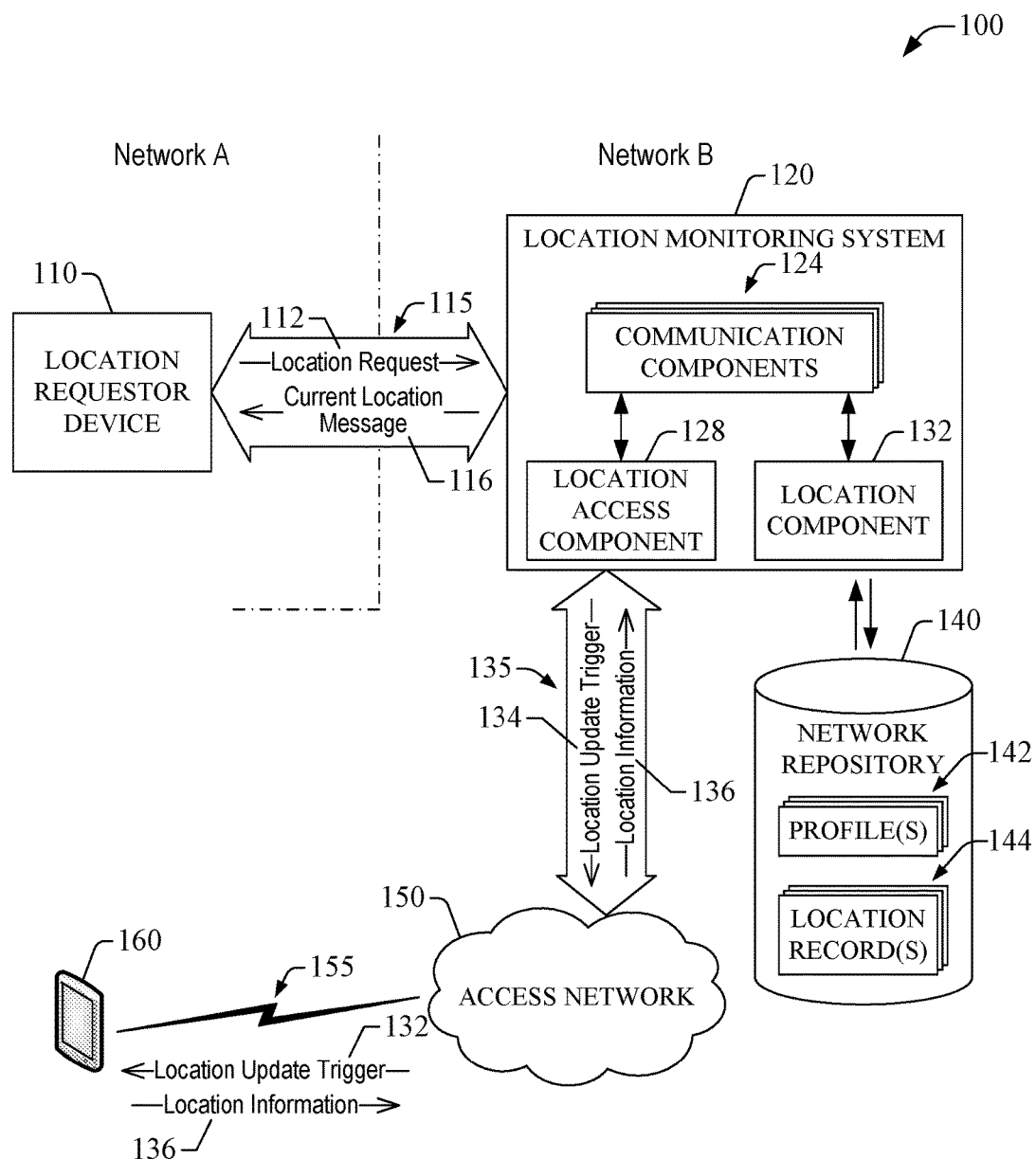
FIG. 1 presents an example of an operational environment for determination of a location of a mobile device in accordance with one or more embodiments of the disclosure.

The disclosure recognizes and addresses, in at least certain embodiments, the issue of locating a mobile device. In this regard, as mentioned, the design of conventional location technologies leaves much room for improvement. To further illustrate the issues with conventional designs, prior to obtaining an estimate of the location of the smartphone, a software module, such as a specialty software application, can be made available to the smartphone, which can implicate human intervention, e.g., an end-user can cause the smartphone to download and install the software module. Yet, some end-users may not adopt the software module, despite the benefits of having access to location based services that leverages estimates of the current location of the smartphone. Even when an end-user causes the smartphone to download and install the software module, the end-user may fail to maintain an updated version of the software module, with the ensuing potential loss of reliability of the generated location estimates or potential compromised functionality of the software module.

Further, even when a smartphone has a current version of a software module that can determine location of the smartphone, determining a current location of smartphone after it is lost (either by itself or in conjunction with a person who carries the smartphone) can involve significant human intervention and a usually tedious process that can slow, or even preclude, the finding of the lost smartphone. Typically, after a person is reported missing or the smartphone of the person is lost, law enforcement can contact a service provider of the mobile device only after a suitable authorization is obtained. The service provider can then provide information regarding a location of the lost smartphone. Providing such information generally involves processing charging data records (CDRs) and last location updates of the phone within 24 hours, and/or producing a list of such locations to law enforcement. Locations made available by the service provider in such a manner can provide little or no help in finding the lost smartphone, or a missing person having the smartphone, because of potential mobility of the smartphone. Even when the locations provided by the service provider are accurate, the period involved in generating such locations can result in harm to the missing person that can be in possession of the smartphone.

Embodiments of the disclosure permit asynchronous determination of a current location of user equipment or other types of mobile devices. Such a determination can be originated or otherwise prompted by a device remotely located from the user equipment and can be performed, in certain embodiments, by a system within a network that provides wireless service and/or other types of services to the user equipment. The device and the user equipment can operate within different networks. The location of the user equipment can be provided as a location service, without reliance on a dedicated location module (e.g., a specialty software application or another type of software or firmware) and/or other components at the user equipment. The location service can utilize signals from a global navigation satellite system (GNSS), and can provide location information in response to a prompt from an authorized remote device. The authorized remote device can be or can include a device associated with the user equipment or a third-party device. In certain embodiments, a network architecture can locate a user equipment having a suitable authorization configuration. In one example, the authorization configuration can include predetermined authorization settings in a user device profile initially stored (e.g., stored at a time of provisioning or activating the user equipment) by a storage device of a communication network. In addition or in other embodiments, the network architecture can locate the user equipment after receiving the opt-in information for the service. In one embodiment, the authorized remote device can be associated with a platform for electronic commerce, such as a network of web-based merchant. In another embodiment, the authorized remote device can be associated with a platform of a law enforcement agency in order to locate user equipment or other type of mobile devices in case of disaster and/or other situations where the user equipment or an associated end-user has to be found.

As described in greater detail below, certain embodiments of the disclosure can utilize or otherwise leverage a built-in satellite-signal receiver and/or another type of receiver on the user equipment for which a location estimate is to be determined. The user equipment can utilize the built-in receiver to access global positioning system (GPS) signals and/or signals from other global navigation satellite systems (GNSSs). The satellite-signal receiver and/or associated circuitry in the user equipment can generate location information using at least a portion of such signals. In one example, the location information can include an estimate of a current location of the user equipment. In addition or in another embodiment, the disclosure can utilize or otherwise leverage a receiver configured to receive terrestrial radiofrequency signals in order to generate location information. Such location information can permit generation, at a network device, for example, of an estimate of a current location of the user equipment.

Regardless of the approach for generation of location information and/or the type of location information that is generated, the location information can be generated in response to a text message or another type of communication directed to the user equipment. The user equipment can provide the location information to a remote device that originates the message. The location information can be provided according to an authorization configuration that can include opt-in information indicative of acceptance of tracking of location of the user equipment or opt-out information indicative of rejection of such tracking. For a suitable authorization configuration, an end-user associated with the user equipment or a third-party device (such as a law-enforcement agent or an agent of a service provider) can access or otherwise determine the location of the user equipment. The authorization configuration can include, for example, predetermined opt-in parameters or other types of data structures representative of the opt-in information. Such parameters and/or data structures can be stored by a storage device in a communication network (e.g., the network repository 140) in connection with a process of provisioning or activating the user equipment. In addition or as an alternative to locating user equipment, certain network architectures of the disclosure can configure and/or can provide customer preferences and/or other type of commercial information associated with the user equipment.

While various aspects of the disclosure are illustrated in connection with user equipment, such as a smartphone or a tablet computer, the disclosure is not limited in that respect and features of the disclosure can be implemented in any mobile device, such as a wearable device (e.g., a watch, a medical device), an infotainment vehicular system, a vehicular access point (AP) device, a navigation mobile device, a gaming mobile console, or the like. In addition, embodiments of the disclosure are not limited to a specific technology or network for wireless communication. Embodiments of the disclosure can be implemented in substantially any or any wireless communication network (second-generation (2G), third-generation (3G), or fourth-generation (4G) network and variant thereof) and non-wireless communication network (broadband network, a cable network, a conventional Public Switched Telephone Network (PSTN), etc.). In addition, such aspects, features, or advantages can be realized irrespective of telecommunication radio technology or wireline technology. Examples of such radio technologies or wireless networks include Femtocell technology, Wi-Fi, Worldwide Interoperability for Microwave Access (WiMAX); Enhanced General Packet Radio Service (Enhanced GPRS); Third Generation Partnership Project (3GPP) Long Term Evolution (LTE); 3GPP Universal Mobile Telecommunications System (UMTS); Third Generation Partnership Project 2 (3GPP2) Ultra Mobile Broadband (UMB); High Speed Packet Access (HSPA); High Speed Downlink Packet Access (HSDPA); High Speed Uplink Packet Access (HSUPA); Global System for Mobile Communication (GSM) Enhanced Data Rate for GSM Evolution (EDGE) RAN or GERAN; UMTS Terrestrial Radio Access Network (UTRAN); or LTE Advanced. Examples of wireline technology include fiber-optic backbone networks, digital subscriber line (DSL) networks, T1/E1-based networks, Ethernet backbone networks, etc. Embodiments or related aspects also can be advantageously implemented in legacy telecommunication technologies.

Implementation of features of the disclosure can provide, in at least certain embodiments, improvements over conventional technologies for locating a mobile device. In one example, the mobile device can be located without establishing a call session with mobile device or relying on dedicated location service software and/or firmware within the mobile device. Tracking of the location of the mobile device is simply contingent on a permission to monitor the current location of the mobile device is configured. Such a permission can be configured by an end-user associated with the mobile device (e.g., an owner or a parent of the owner), or an agent of a service provider that provides wireless service and/or other types of services to the mobile device. Configuration of the permission to track the location of the mobile device can be implemented on-demand by the agent and can be monetized by the service provider. In another example, any remote device (mobile or otherwise) that can send a short message service (SMS) message or another type of communication message to the mobile device can track the location of the mobile device. In yet another example, by adjusting the scope of the permission to monitor the current location of the mobile device, a device can be granted permission to track the location of the mobile device for a certain period or under certain events. Similarly, another device can be declined to track the location device of the mobile device for a defined period or in response to certain events. Thus, the monitoring of the location of the mobile device can be dynamically modified without changes to the mobile device or a remote device that intends to track the location of the mobile device.

With reference to the drawings, FIG. 1 illustrates an example of an operational environment 100 for determination of a location of a mobile device in accordance with one or more embodiments of the disclosure. The operational environment 100 can rely, for example, on exchange of communication messages or other types of communications between different devices and/or components in order to generate an estimate of a current location of mobile device in response to at least one of the messages. As illustrated, a location requestor device 110 can send a location request 112 to a location monitoring system 120. The location requestor device 110 can be associated with a platform architecture or network (represented with a "Network A" label in FIG. 1) having a specific functionality and/or configured to provide specific services. In certain embodiments, the location requestor device 110 can be deployed (e.g., installed, configured, and accepted) at a platform for electronic commerce. In other embodiments, the location requestor device 110 can be deployed at a platform or network for law enforcement. The location monitoring system 120 can be deployed in another platform architecture or network (represented with a "Network B" label in FIG. 1) different from that in which the location requestor device 110 is deployed. Communications links 115 that can communicatively couple the location requestor device 110 and the location monitoring system 120 can permit transmission of the location request 112. The communication links 115 can be embodied in or can include wireless links (e.g., deep-space wireless links and/or terrestrial wireless links); wireline links (e.g., optic-fiber lines, coaxial cables, and/or twisted-pair lines); routers; switches; server devices; aggregator devices; a combination of the foregoing; or the like.

Figure 2:
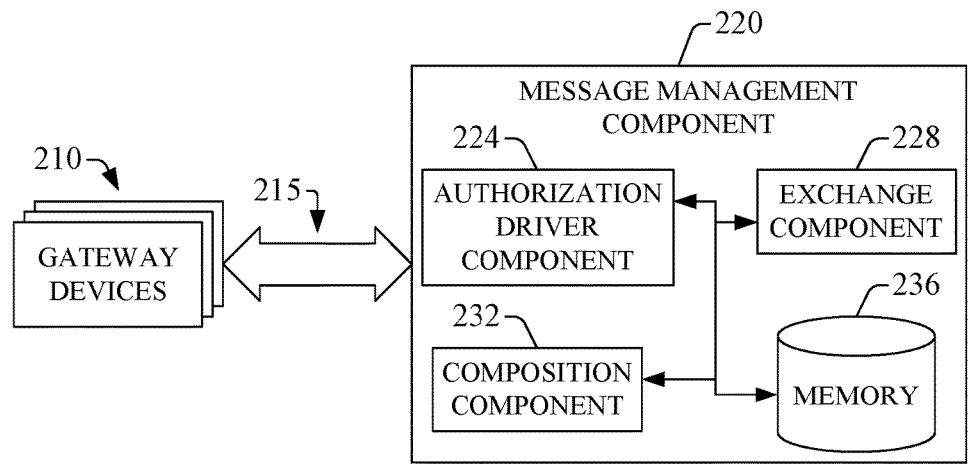
FIG. 2 presents an example of a communication component for determination of a location of a mobile device in accordance with one or more embodiments of the disclosure.

In certain embodiments, the location request 112 can be embodied in or can include a short message service (SMS) message or another type of communication message directed to a mobile device 160. Suitable types of communication messages include, for example, a multimedia messaging service (MMS) message, a session initiation protocol (SIP) message, an unstructured supplementary service data (USDD) message, an email message, or the like. As such, the communication request 112 can be addressed to a defined communication address of the mobile device 160—e.g., a telephone number, an international mobile subscriber identity (IMSI), an internet protocol (IP) address, a media access control (MAC) address, a session initiation protocol (SIP) address, or the like. The location monitoring system 120 can receive the location request 112 and can utilize or otherwise leverage the communication address to process the location request 112. Specifically, in certain embodiments, the location monitoring system 120 includes communication components 124, at least one of such components can receive the location request 112. A location component that receives the location request 112 can be configured to receive a communication according to a communication protocol that the location requestor device 110 relies on to send the location request 112. The communication protocol can be embodied in or can include short message peer-to-peer (SMPP) protocol, simple mail transport protocol (SMTP), hypertext transfer protocol (HTTP), internet protocol (IP), internet control message protocol (ICMP), mobile application part (MAP) protocol, or the like. As such, in one example, the location component that receives the location request 112 can be embodied in or can constitute a web-based gateway device. In another example, such a location component can be embodied in or can constitute a mobile switching center (MSC) device. More generally, in at least certain embodiments, such as the example embodiment shown in FIG. 2, the communication components 124 can include gateway devices 210 communicatively coupled to a message management component 220 via communication links 215. The communication links 215 can include wireless link(s), wireline link(s), and/or reference link(s). A first gateway device of the gateway devices 210 can receive a communication message from a device external to the location monitoring system 120, and the message management component 220 can process the communication message and/or can deliver it to a second gateway device of the gateway devices 210. The message management component 220 also can send the communication message to a component within the location monitoring system 120. The second gateway device can send the originally received message or a different message to another device external to the location monitoring system 120.

With further reference to FIG. 1, the location monitoring system 120 can include a location access component 128 that can determine if the location request 112 is to be fulfilled. Specifically, the location access component 128 can determine if location information associated with the mobile device 160 (e.g., a smartphone or a tablet computer) can be provided to the location requestor device 110 in response to the location request 112. To that end, in certain embodiments, the location access component 128 can receive an instruction or another type of signaling to perform such a determination from a communication component of the communication components 124. For instance, in one embodiment, such as the embodiment shown in FIG. 2, the communication component that sends the instruction or other signaling can be embodied in the message management component 220, in which component an authorization driver component 224 can send the instruction or the signaling. In response to such an instruction or signaling, the location access component 128 can access authorization information related to tracking location of the mobile device 160, and can utilize the access authorization information to ascertain that location of the mobile device 160 can be tracked or that such a location cannot be tracked. In a scenario in which the location of the mobile device 160 can be tracked, the location request 112 can be fulfilled. The access authorization information can be included in a profile of mobile device 160. The profile can be retained or otherwise recorded in one or more computer-accessible memory elements 142 (referred to as profile(s) 142) within a network repository 140. The profile(s) 142 can embody or can constitute, in one example, a database (relational or unstructured, for example) within a home subscriber server (HSS) device or a home location register (HLR) device. In one implementation, the network repository 140 can be embodied in or can include distributed computer-accessible information storage apparatuses, such as a consolidated network repository (CNR), which is one implementation of cloud storage.

Figure 3:
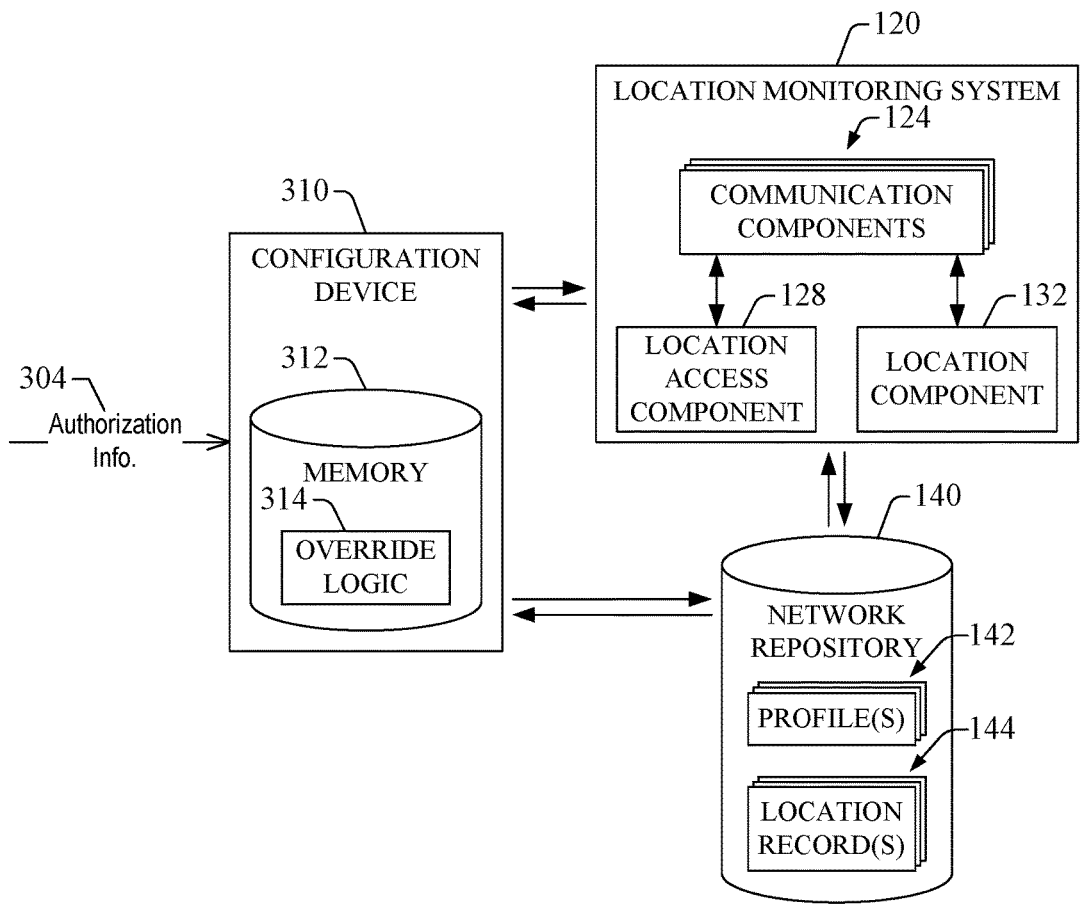
FIG. 3 presents an example of a system for determination of a location of a mobile device in accordance with one or more embodiments of the disclosure.

In one scenario, access authorization information that is acquired by the location access component 128 can include opt-out information (e.g., data or metadata) that specifies that tracking location of the mobile device 160 is not permitted. In response, the location access component 128 can determine that location information associated with the mobile device 160 is not to be provided in response to the location request 112. In addition or in other scenarios, the location access component 128 can implement an exception handling process, which can result in rejection of the location request 112. The exception handling process can be specific to the type of location requestor device 110. For instance the exception handling process implemented for user equipment can be different from the exception handling process implemented for customer premises equipment or to a network device. In certain implementations, depending on the location requestor device 110, implementation of the exception handling can have additional or alternative outcomes besides rejection of the location request 112. Specifically, in certain embodiments, such as the example embodiment shown in FIG. 3, implementation of the exception handling cause a configuration device 310 to override the opt-out information and modify the authorization information present in the device profile associated with the mobile device 160. To such an end, in one example, the configuration device 310 can be communicatively coupled to the location access component 128 and can execute override logic retained in a memory element 314 (referred to as override logic 314) within one or more computer-accessible storage devices 312 (referred to as memory 312). More specifically, in response to the opt-out information or absence of permission to track location of the mobile device 160, the configuration component 310 can receive, from the location access component 128, signaling or another type of directive to execute the override logic. Execution of the override logic can cause the configuration device 310, or a component therein or functionally coupled thereto, to modify the profile associated with the mobile device 160 to include opt-in information (e.g., data or metadata) indicative or otherwise representative of permission to track the location of the mobile device 160. In addition, the implementation of the exception handling process can cause the location access component to retry accessing the authorization information, which after the modification performed by the configuration component 310, can result in the location access component 128 accessing such opt-in information. The override of authorization information can be implemented in emergency scenarios in which availability of an estimate of the current location of the mobile device 160 can be critical to the integrity of the mobile device 160 or a person that may be carrying the mobile device 160.

Addition or other outcomes of an exception handling process implemented by the location access component 128 can include communication with an agent device of a service provider that provide wireless service or other types of services to the mobile device 160. The communication can convey to the agent device that tracking of the location of the mobile device 160 is not permitted. In response, the agent device (not shown) can send authorization information 314 to the configuration device 310, where the authorization information can include opt-in information. The configuration device 310 can utilize or otherwise leverage the authorization information 314 to modify a device profile of the mobile device 160 in order to permit tracking of the location of the mobile device 160. In certain scenarios, the agent device can send the authorization information 314 on-demand, in response to a request from a device associated with the mobile device 160. Such a device can be billed for the submission of the authorization information 314 and the re-configuration of the device profile of the mobile device 160.

With reference again to FIG. 1, in other scenarios, access authorization information that is acquired by the location access component 128 can include opt-in information that specifies that tracking location of the mobile device 160 is permitted. The opt-in information also can specify the scope of permission to track the location of the mobile device 160. For instance, the opt-in information can determine a period during which location of the mobile device 160 can be monitored, a group of devices permitted to monitor the location of the mobile device 160, conditions or events in response to which the location of the mobile device 160 can be tracked, a combination thereof, or the like. The group of devices can include, for example, a device associated with a platform for electronic commerce, a device associated with a platform for law enforcement, a user equipment associated with the mobile device 160, and the like. A configuration component (not shown in FIG. 1) can permit configuring the opt-in information to specify tracking period, a device to be included in the group of devices, one of such conditions or events, a combination thereof, or the like. For instance, the configuration component can receive a telephone number or another communication address (e.g., a MAC address) of a user equipment that can be permitted to track the location of the mobile device 160. The configuration component can be embodied in, for example, the configuration device 310 shown in FIG. 3, and a communication address of user equipment permitted to track the location of the mobile device 160 can be received via authorization information 314.

In response to opt-in information, the location access component 128 determines that location information associated with the mobile device 160 can be provided in response to the location request 112. Therefore, the location access component 128 can signal or otherwise indicate to a communication component of the communication components 124 that an estimate of the current location of the mobile device 160 is to be determined. To that end, in certain embodiments, the location access component 128 can direct or otherwise cause the communication component to send a location update trigger 134 to the mobile device 160. The location update trigger 134 can cause the mobile device 160 to perform a location update, which can result in generation of location information representative or otherwise indicative of a current location of the mobile device 160. In response to the location update, the mobile device 160 can send at least a portion of such information. As an example, the communication component can be embodied in or can include the message management component 220 shown in FIG. 2, which can include a composition component 232 that can generate the location update trigger 134. In such an embodiment, prior to generation of the location update trigger 134, the authorization driver component 224 can receive the indication that the estimate of the current location of the mobile device 160 is to be determined. In certain embodiments, the second message can be embodied in a control message within a standardized protocol for generation of a location update of the mobile device, such a location area update (LAU) in UMTS or a location determination procedure in E-911. The location update trigger 134 can be embodied in or can include, for example, a communication message directed to the mobile device 160, such as a SMS message, an MMS message, a SIP message, a USDD message, an email message, or the like. It should be appreciated that, in one implementation, the location update trigger 134 can coincide with the location request 112. Thus, the composition component 232 can replicate the location request 112 and can assign the replicated location request 112 as the location update trigger 134. In the alternative, in such an implementation, the message management component 220 can circumvent the composition component 232, and can send the location request 112 as the location update trigger 134.

Figure 4:
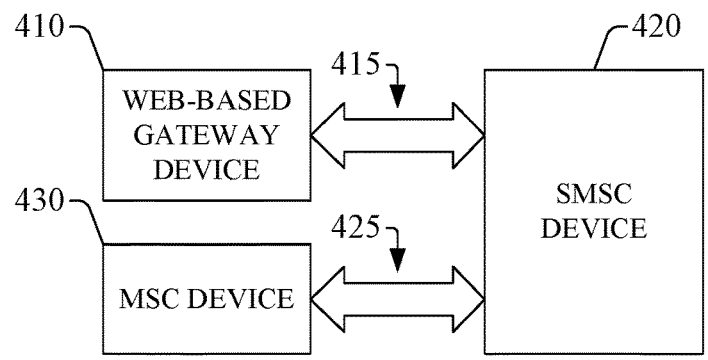
FIG. 4 presents another example of a communication component for determination of a location of a mobile device in accordance with one or more embodiments of the disclosure.

The communication component that can send the location update trigger 134 (e.g., the message management component 220 shown in FIG. 2) can leverage another communication component of the communication components 124 to route the location update trigger 134 to a network device within an access network 150 that is communication with the mobile device 160. The network device (not depicted in FIG. 1) can be embodied in a base station or an access point device, and can send the location update trigger 134 to the mobile device 160 via a downstream link (DL) of wireless links 155. As an illustration, in certain embodiments, such as the embodiment shown in FIG. 2, a delivery component 228 within the message management component 220 can access routing information from the network repository 140 shown in FIG. 1. For instance, the routing component can be retained in a home location register (HLR; not depicted in FIG. 1). The routing information can permit determining a gateway device of the gateway devices 210 that is configured to send information to the network device. As another illustration, FIG. 4 presents an example embodiment of the communication devices 124 in accordance with at least some of aspects described herein. Specifically, the communication component that sends the location update trigger 134 can be embodied in or can constitute a short message service center (SMSC) device 420, and the communication component that routes the location update trigger 134 can be embodied in or can constitute a MSC device 430. In addition, a web-based gateway device 410 can receive the location request 112. In such an example embodiment, the location update trigger 134 can be or can include a SMS message. One or more communication links 415 can couple communicatively the web-based gateway device 410 and the SMSC device 420. Thus, the communication link(s) 415 can permit exchange of information (data, metadata, and/or signaling) between such devices. Similarly, one or more communication links 425 can couple communicatively the MSC device 430 and the SMSC device 420. Thus, the communication link(s) 425 can permit exchange of information (data, metadata, and/or signaling) between such devices.

Continuing with FIG. 1, the mobile device 160 can receive the location update trigger 134 and, in response, can generate location information indicative or otherwise representative of a current location of the mobile device 160. In certain implementations, the mobile device 160 can process payload data received in the location update trigger 134, and for payload data including a defined keyword (e.g., "locate" or "position"), the mobile device 160 can generate the location information. The location information can be generated in numerous ways, depending on architecture of the mobile device 160 and/or communication signals available thereto. In a scenario in which the mobile device 160 includes a satellite-signal receiver, the mobile device 160 can utilize the satellite-signal receiver to access global positioning system (GPS) signals and/or signals from other GNSSs, such as BeiDou navigation satellite system (BDS), quasi-Zenith satellite system (QZSS), and/or GPS aided geo augmented navigation (GAGAN) system. A processor and/or dedicated hardware in the mobile device 160 can process the GPS signals or signals from another GNNS in order to generate location information indicative of a current location of the mobile device 160. The location information represents an estimate of the current location of the mobile device 160. In the alternative, the mobile device 160 can send the GPS signals or the signals from another GNNS to the location component 132, which can determine an estimate of the current location of the mobile device 160. In such a scenario, the location information generated by the mobile device 160 is embodied in the satellite-based signals accessed by the mobile device 160.

In certain instances in which signals from a GNNS have poor quality (e.g., environment causes significant scattering) or are received from a subset of the satellites in the GNNS, the mobile device 160 can receive assistance information from the location component 132. The assistance information can be indicative or otherwise representative of position of one or more satellites of the GNNS (e.g., almanac and/or ephemeris data) and/or reference time. The mobile device 160 can process the assistance information in order to generate location information indicative of a current location of the mobile device 160.

Regardless of the specific type of location information generated at the mobile device 160, the mobile device 160 can send location information 136 indicative or otherwise representative of the current location of the mobile device 160 to the location component 132. Specifically, in one implementation, the location information 136 can be sent wirelessly, via an upstream link (UL) of the wireless links 155, to a network device (e.g., a base station, an access point device, or a location measurement unit (LMU)) of the access network 150. In certain embodiments, the access network 150 can be embodied in a radio access network (RAN) that operates in accordance with one or more radio technology protocols for wireless communication. The network device can send the information 136 to a first communication component (e.g., a MSC device) of the communication components 124, which in turn can send the location information 136 to a second communication component (e.g., SMSC device) of the communication components 124. The second communication component can send the location information 136 to the location component 132. In one embodiment, such as the example embodiment shown in FIG. 2, the exchange component 228 can receive the location information 136 and can relay the received information to the location component 132.

In other instances in which signals from a GNNS are unavailable or in embodiments in which the mobile device 160 lacks a satellite-signal receiver, the mobile device 160 can utilize or otherwise leverage a transceiver configured to transmit and receive terrestrial radiofrequency signals in order to generate location information. Accordingly, in one implementation, in response to the location update trigger 134, the mobile device 160 can send pilot signals to a group of network devices (e.g., multiple base stations or AP devices, or multiple LMUs) of the access network 150. The access network can determine timing information indicative of the time of arrival of the pilot signals at each of the group of network devices, and can send such information to the location component 132. In response, the location component 132 can determine, for example, a time difference of arrival (TDOA) for each pair of the group of network devices, and can implement a multilateration process in order to determine an estimate of a current location of the user equipment. In other implementations, the mobile device 160 and the location component 132 can implement or otherwise utilize an advanced forward link trilateration (AFLT) process in order to generate an estimate of the current location of the mobile device 160. Thus, the mobile device 160 can probe (e.g., receive and analyze) pilot signals from the group of network devices, which can result in timing information and/or distance information indicative or otherwise representative of a distance from a network device (e.g., a base station) to the mobile device 160. The timing information and/or the distance information can embody or can constitute the location information 136, and the mobile device 160 can send such information to the location component 132. In response, the location component 132 can perform or otherwise utilize a trilateration process based at least a portion of the location information 136 in order to generate the estimate of the current location of the mobile device 160.

As described herein, the location component 132 can receive location information 136 from the mobile device 160 and can determine an estimate of the current location of the mobile device 160 using the location information 136. Such an estimate can be formatted geographic coordinate format (e.g., latitude, longitude, and/or altitude) or in civic address format (e.g., civic number, street name, and ZIP code). In embodiments in which the mobile device 160 can receive signals from a GNNS, the location information 136 can embody or can constitute the estimate of the current location of the mobile device 160. As such, the location component 132 can assign the received location information 136 to a record indicative of the estimate of the current location of the mobile device 160. Such a record can be retained at the network repository 140, within one or more memory elements 144 (referred to as location record(s) 144). In embodiments in which satellite signals are unavailable or the mobile device 160 lacks a satellite-signal receiver, the location component 132 can process at least a portion of location information 136 in order to generate the estimate of the current location of the mobile device 160. More specifically, in certain implementations, the location component 132 can implement multilateration (e.g., TDOA multilateration or AFLT) to determine such an estimate.

Figure 5:
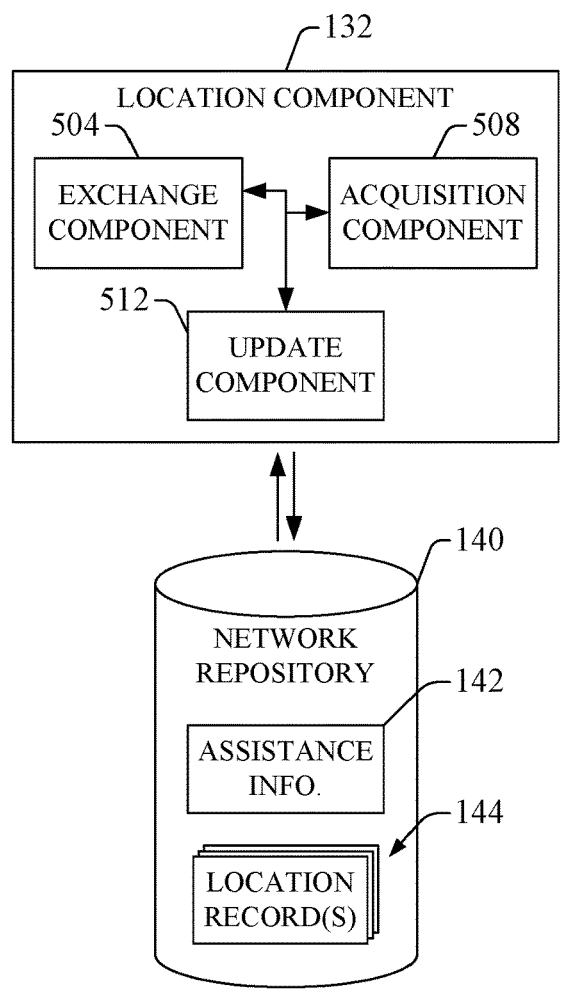
FIGS. 5-6 present an example of a location component for determination of a location of a mobile device in accordance with one or more embodiments of the disclosure.

As an illustration, an example embodiment of the location component 132 is shown in FIG. 5. An exchange component 504 can receive and send information (e.g., data, metadata, and/or signaling) to a communication device (e.g., message management component 220). The information can include, for example, an instruction or another type of directive to determine the estimate of the current location of the mobile device 160, as described herein. In scenarios in which the mobile device 160 can generate location information indicative of such an estimate, the exchange component 504 can receive the location information (e.g., location information 136) and can provide the information to an update component 512 that retain the estimate of the current location of the mobile device 160 within the location record(s) 144. In one implementation, the location record(s) 144 can be embodied in or can constitute an automatic location information (ALI) database. As illustrated in FIG. 5, the location component 132 can include an acquisition component 508 that can send assistance information to the mobile device 160, as described herein. Assistance information can be retained a memory element 142 (referred to as assistance info. 142) within the network repository 140. Assistance information also can be retained in one or more computer-accessible memory devices within the location component 132. In addition, the acquisition component 508 can generate the estimate of the current location of the mobile device 160 in scenarios in which GNNS signals are unavailable to the mobile device 160, as described herein.

Figure 6:
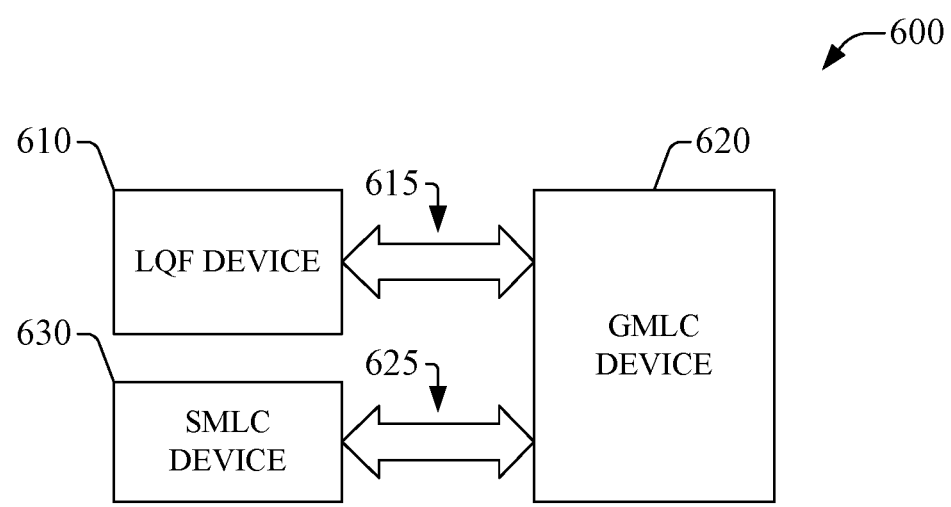

As another illustration, a distributed embodiment of location component 132 is shown in FIG. 6. The location component 132 can include a location query function (LQF) device that can receive an instruction to determine a current estimate of the location of the mobile device 160. The LQF device 610 can cause a communication component (e.g., a SMSC device) to send the location update trigger 134 (e.g., SMS message) to the mobile device 132. As described herein, the location update trigger 134 can cause the mobile device 160 to perform a location update. Therefore, in one implementation, the mobile device 160 can exchange information with a serving mobile location center (SMLC) device 630 in order to generate location information representative of the current location of the mobile device 160, as described herein. The SMLC device 630 can send the location information to a gateway mobile location center (GMLC) device 620, which can update a location record (e.g., one of the location record(s) 144) associated with the mobile device 160. One or more communication links 625 can permit exchange of information between the GMLC device 620 and the SMLC device 630. The LQF device 610 can access the updated location record and can send such a record to the location access component 128.

Regardless of the specific embodiment of the location component 132, upon or after an estimate of the current location of the mobile device 160 becomes available in response to the location update trigger 134 (e.g., a SMS message or control information), the location component 132 can send the estimate to the location requestor device 110. To that end, in one implementation, the location component 132 can send the estimate of the current location of the mobile device 160 to a first communication component of the communication components 124. The first communication component (e.g., a SMSC device) can compose a communication message including the estimate of the current location of the mobile device 160. More specifically, as an illustration, in an embodiment in which the first communication component is embodied in or includes the message management component 220 shown in FIG. 2, the exchange component 228 can receive the estimate of the current location of the mobile device 160. The exchange component 228 can provide the estimate to the composition component 232, which can compose the communication message. The communication message can be referred to as current location message 116, and is addressed or otherwise directed to a defined communication address of the location requestor device 110, such as a telephone number, an IP address, a MAC address, a SIP address, or the like. The current location message 116 can be embodied in or can include, for example, a SMS message, a MMS message, a SIP message, a USDD message, an email message, or the like. Accordingly, the current location message 116 can be composed according to a defined communication protocol can be embodied in or can include SMPP protocol, SMTP, HTTP, IP, ICMP, MAP, or the like. In addition, the current location message 116 can include a hyperlink associated with geographic coordinates indicative of the estimate of the current location of the mobile device 160. The hyperlink can be configured to be executed by a web application (e.g., a HTTP application or a MAP application) at the location requestor device.

It should be appreciated that the first communication component that composes the current location message 116 can be the same communication component (e.g., message management component 220) that can generate and/or route the location update trigger 134. In addition, the first communication component can send the current location message 116 to a second communication component of the communication components 124. The second communication component (e.g., a MSC device) can send the current location message 116 to the location requestor device 110. It should be appreciated that the second communication component (e.g., a web-based gateway device) can be the same communication component that can receive the location request 112. In certain instances, with further reference to FIG. 2 as an illustration, the second communication component can be embodied in or can include a gateway device of the gateway devices 210.

The location requestor device 110 in the operational environment 100 can receive the current location message 116 and, thus, the location request 112 can be fulfilled. It should be appreciated that the location request 112 can be fulfilled without reliance on dedicated location service software (e.g., a specialty software application) being configured and/or executed in the mobile device 160. Instead, as described herein, the location request 112 can be fulfilled by validating a preconfigured permission to track the location of the mobile device 160, and exchanging suitable messages between the location requestor device 110, the location monitoring system 120, and the mobile device 160. It should further be appreciated that the location request 112 can be fulfilled without intervention of an end-user associated with the mobile device 160, such as configuring a location tracking preference at the mobile device 160 within a specialty software application, or selecting a generic location based service at the mobile device 160. By fulfilling the location request 112, the location monitoring system 120 can permit, for example, tracking the location of the mobile device 160 in response to certain events, such as the mobile device 160 being stolen or lost, an end-user known to carry the mobile device 160 being missing, or occurrence of natural disaster or other type of emergency (e.g., riots or a terrorist attack) in an area in which the mobile device 160 is known to be operating.

The location requestor device 110 can implement various processes based on the availability of the location request 112. For example, in an embodiment in which the location requestor device 110 is embodied in a device associated with a platform for electronic commerce, the device can provide an estimate of the current location of the mobile device 160 to affiliate devices associated with affiliate platforms for electronic commerce. In addition or in the alternative, the device can supply various types of promotional content to the mobile device 160 based on the estimate of the current location of the mobile device.

Figure 7:
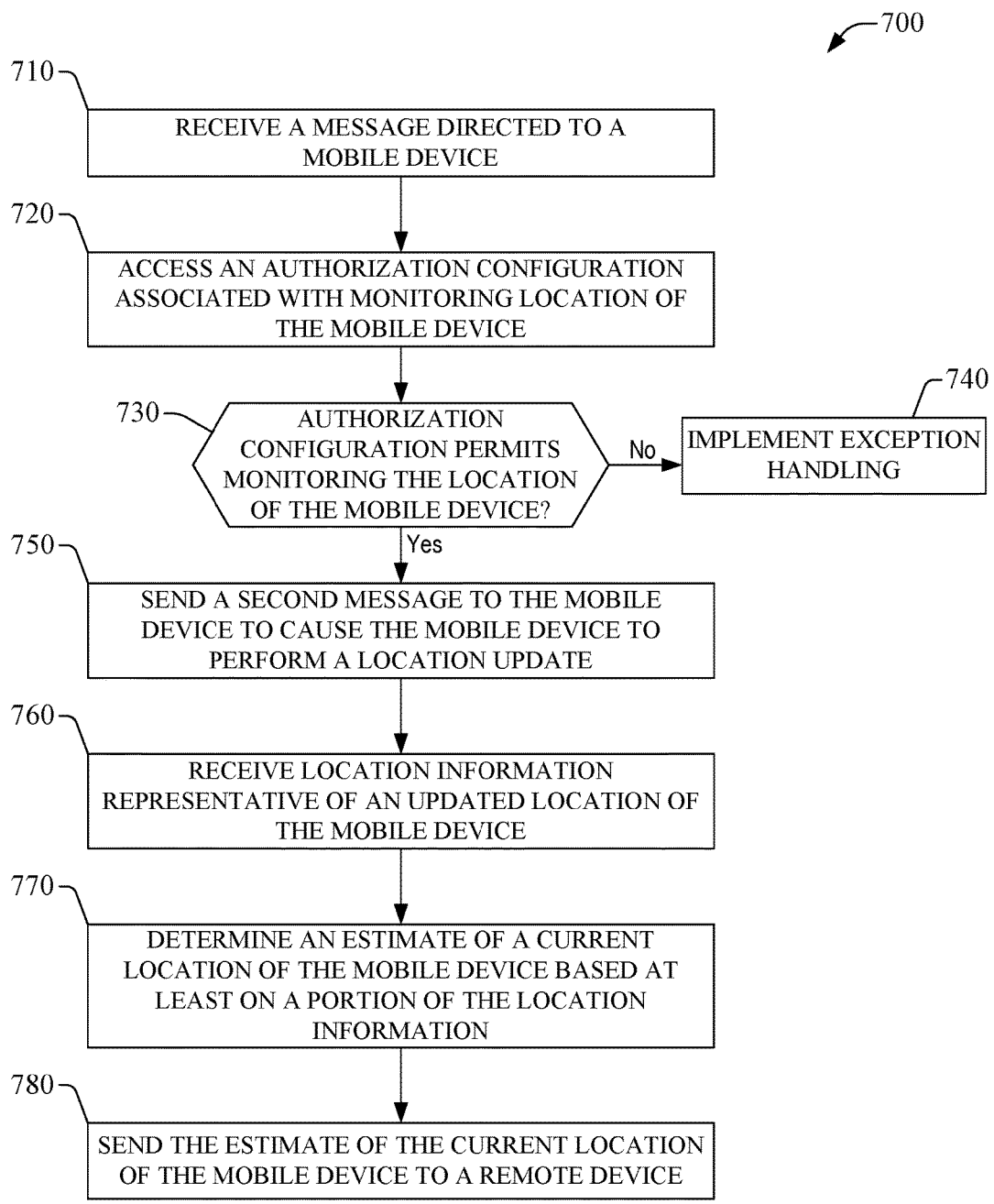
FIG. 7 presents an example of a method for determining a location of a mobile device in accordance with one or more embodiments of the disclosure.
Figure 8:
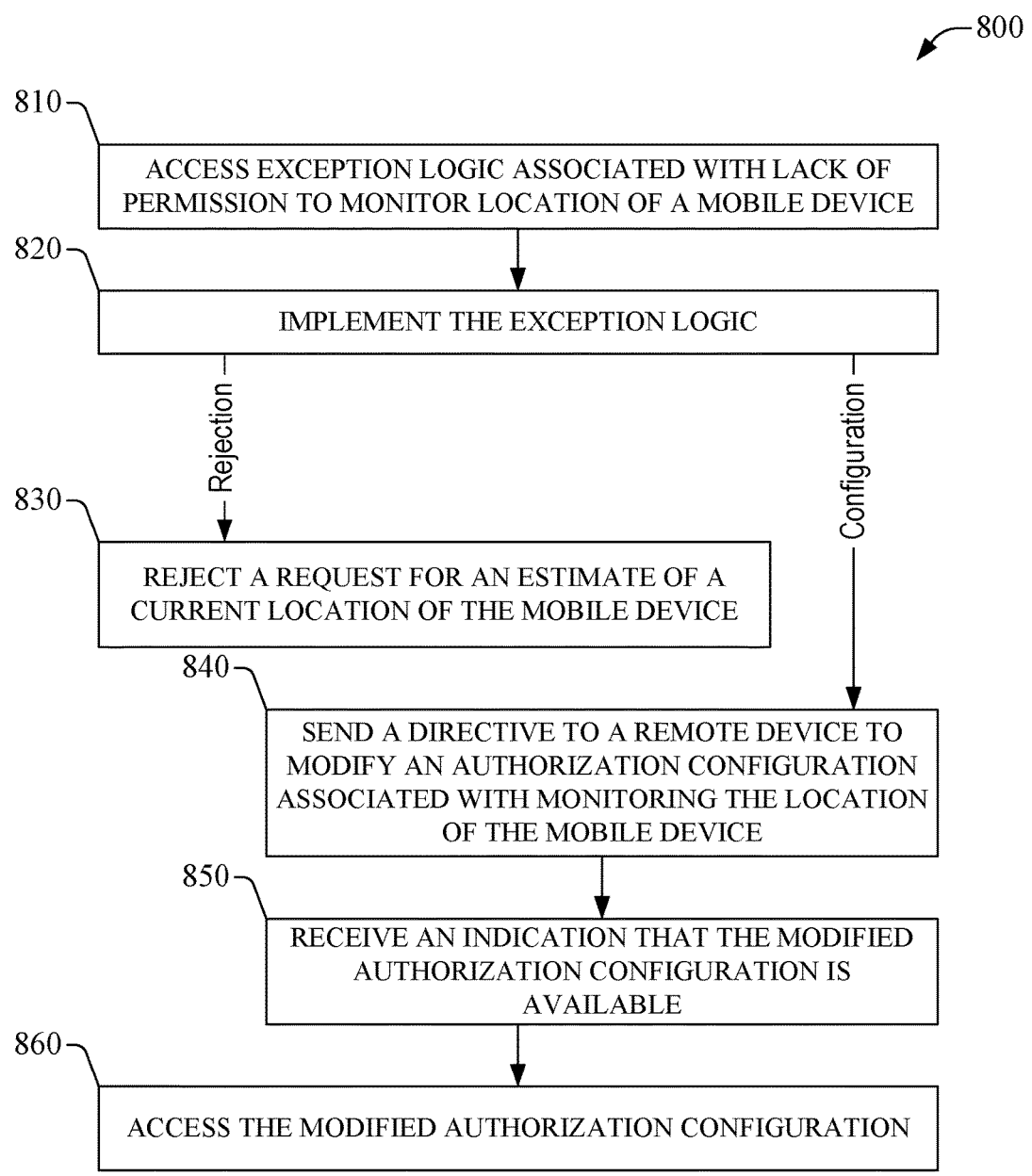
FIG. 8 presents an example of a method for handling an exception in determining a location of a mobile device in accordance with one or more embodiments of the disclosure.

In view of the aspects described herein, an example method that can be implemented in accordance with this disclosure can be better appreciated with reference to FIGS. 7-8. For purposes of simplicity of explanation, example methods disclosed herein are presented and described as a series of acts; however, it is to be understood and appreciated that the disclosed subject matter is not limited by the order of acts, as some acts may occur in different orders and/or concurrently with other acts from that shown and described herein. For example, one or more example methods disclosed herein can alternatively be represented as a series of interrelated states or events, such as in a state diagram. Moreover, interaction diagram(s) may represent methods in accordance with the disclosed subject matter when disparate entities enact disparate portions of the methodologies. Furthermore, not all illustrated acts may be required to implement a described example method in accordance with the subject specification. Further yet, two or more of the disclosed example methods can be implemented in combination with each other, to accomplish one or more features or advantages described herein. It should be further appreciated that the example methods disclosed throughout the subject specification are capable of being stored on an article of manufacture to facilitate transporting and transferring such example methods to computers for execution, and thus implementation, by a processor or for storage in a memory.

Methods disclosed throughout the subject specification and annexed drawings are capable of being stored on an article of manufacture to facilitate transporting and transferring such methodologies to computers for execution, and thus implementation, by a processor or for storage in a memory. In an aspect, one or more processors that enact method(s) described herein can be employed to execute code instructions retained in a memory, or any computer- or machine-readable medium, to implement method(s) described herein; the code instructions, when executed by the one or more processor implement or carry out the various acts in the method(s) described herein. The code instructions provide a computer- or machine-executable framework to enact the method(s) described herein.

FIG. 7 presents a flowchart of an example method 700 for determining location of a mobile device in accordance with one or more embodiments of the disclosure. The example method can be implemented, entirely or in part, by a computing system having processors, memory devices, and/or other computing resources. In certain embodiments, the computing system can be embodied in or can include the location monitoring system 120 described herein in connection with FIG. 1. At block 710, a message directed to a mobile device (e.g., mobile device 160) can be received by the computing system. The message can convey a request for an estimate of a current location of the mobile device, and can be embodied in or can include, for example, a SMS message, an MMS message, a SIP INVITE message, a USDD message, or the like. A communication component (e.g., a web-based gateway) of the computing system can receive the message. In certain implementations, the component can be embodied in or can include a web-based gateway device. In other implementations, the component can be embodied in or can include a mobile switching center (MSC) device. As described herein, the message can be originated at or otherwise provided by a remote device deployed within a first network (e.g., represented as "Network A" in FIG. 1) that is different from a second network (e.g., represented as "Network B" in FIG. 1) that provides wireless service or other services to the mobile device. The first network can embody or can include a platform for electronic commerce or a platform for law enforcement.

At block 720, an authorization configuration associated with monitoring location of the mobile device can be accessed by the computing system. As described herein, the authorization configuration can be retained or otherwise recorded within a profile of the mobile device, and can include information (e.g., opt-in information or opt-out information) indicative or otherwise representative of permission or lack thereof to monitor the location of the mobile device. It should be appreciated that, as described herein, the authorization configuration is accessed in response to the message received by the computing system at block 710. In addition, in certain embodiments, the authorization configuration can be preconfigured or otherwise predetermined prior to reception of such a message and without operation of the mobile device to such an end. More specifically, in one example, the authorization configuration can be stored by a storage device in a communication network (e.g., stored at a HSS device or HLR device) in connection with a process of provisioning or activating the mobile device.

At block 730, the computing system can determine if the authorization configuration permits monitoring the location of the mobile device. To that end, the computing system can determine if the authorization configuration includes opt-in information that conveys permission to monitor the location of the mobile device. As described herein, the opt-in information also can specify scope of the permission to monitor the location of the mobile device, e.g., period during which location can be monitored, devices permitted to monitor the location of the mobile device, conditions or events under which location of the mobile device can be monitored, a combination thereof, or the like. In a scenario in which it is ascertained that the authorization configuration does not include opt-in information or includes opt-out information specifying that monitoring of the location of the mobile device is refused ("No" branch), the computing system can implement exception handling at block 740. As described herein, in one example, implementing the exception handling can result in rejection of the request conveyed in the message received at block 710. In the alternative, in a scenario in which it is ascertained that the authorization configuration includes opt-in information that authorizes monitoring the location of the mobile device, the computing system can send a second message to the mobile device at block 750. The second message can cause the mobile device to perform a location update. In certain embodiments, the second message can be embodied in a control message within a standardized protocol for generation of a location update of the mobile device, such a location area update (LAU) in UMTS or a location determination procedure in E-911.

At block 760, location information representative of an updated location of the mobile device can be received by the computing system. The location information can be received by a component (e.g., location component 132) of the computing system that is configured to determine and/or update a current location of the mobile device. At block 770, an estimate of the current location of the mobile device can be determined, by the computing system, based at least on a portion of the location information.

At block 780, the estimate of the current location of the mobile device can be sent, by the computing system, to a remote device. For example, the remote device can be embodied in or can include the location requestor device 110. As described herein, a communication component (e.g., a web-based gateway device or a MSC device) of the computing system can send the estimate of the current location to the remote device. In certain implementations, as described herein, the remote device can be deployed (e.g., installed, configured, and accepted) at a platform for electronic commerce. In other implementations, as described herein, the remote device can be deployed at a platform for law enforcement.

FIG. 8 presents a flowchart of an example method 800 for exception handling in connection with determining location of mobile devices in accordance with one or more embodiments of the disclosure. The example method can be implemented, entirely or in part, by a computing system having processors, memory devices, and/or other computing resources. In certain embodiments, the computing system can be embodied in or can include the location monitoring system 120 described herein in connection with FIG. 1. More specifically, in one of such embodiments, the location access component 128 can implement the example method.

At block 810, exception logic associated with lack of permission to monitor location of a mobile device can be accessed by the computing system. The exception logic can be accessed, for example, in response to an authorization configuration having opt-out information that specifies that location of the mobile device is not to be tracked. At block 820, the exception logic can be implemented. In one embodiment, the location access component 128 in the location monitoring system 120 can access the exception logic and can implement it.

Various outcomes are possible in response to implementation of the exception logic. As illustrated, one outcome can include rejection of a request for an estimate of a current location of the mobile device. As such, at block 830, the request for the estimate of the current location of the mobile device can be rejected. Rejecting such a request can include sending a message to the remote device that originated the request. The message can be embodied in a SMS message, a MMS message, a simple network management protocol (SNMP) message, or the like. A second outcome can include configuration of the authorization configuration including the opt-out information that caused the exception. Such an outcome ("Configuration" in FIG. 8) can result in several operations. For example, at block 840, the computing system can send a directive to modify the authorization configuration to a remote device (e.g., configuration device 310). In addition, at block 850 the computing system can receive an indication that a modified authorization configuration is available (e.g., stored in a device profile associated with the mobile device). As described herein, the modified authorization configuration can include opt-in information representative or otherwise indicative of permission to monitor the location of the mobile device.

The method 800 can contemplate retrying access to authorization configurations after a modification is implemented in response to the accessed exception logic. Thus, at block 860, the modified authorization configuration can be accessed.

It can be appreciated that humans are incapable of performing all of the blocks of the methods 700 and 800. Therefore, the various aspects of method 700 and method 800 cannot be mere implementations of human activities nor as disembodied, mental or abstract operations or embodiments. For example, the method 700 includes wireless exchange of messages over a wireless and/or a non-wireless network. In another example, the method 700 includes determination of an estimate of location of a mobile device using location information received wirelessly. The wireless reception of the location information alone conveys that a human relying on mental operations or mere pen and paper cannot implement at least such a determination block simply because information received wirelessly generally is demodulated and/or decoded according to a complex modulation and coding scheme. Thus, it is readily apparent that humans cannot perform at least the determination of the estimate of the current location of the mobile device that is described herein.

Figure 9:
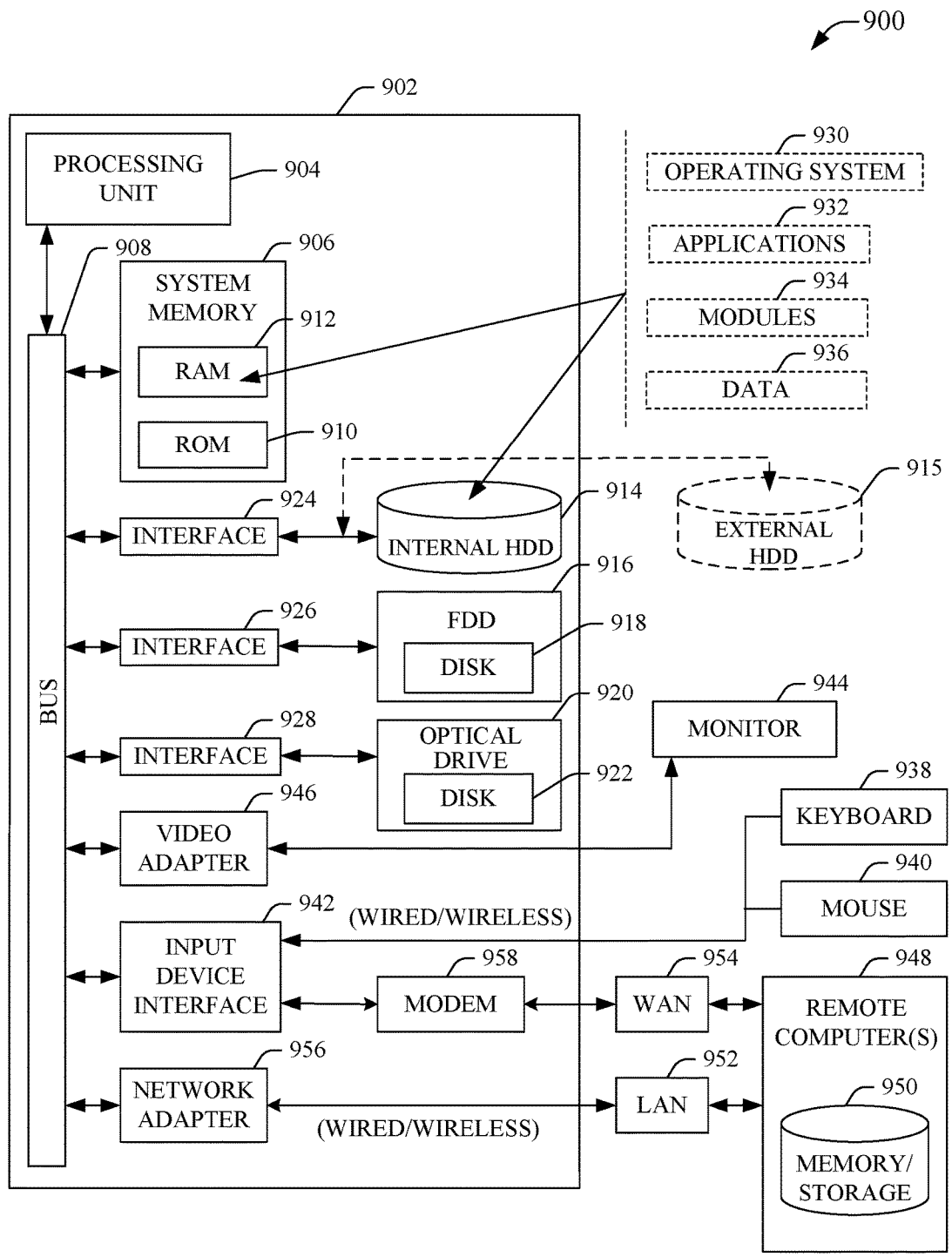
FIG. 9 presents an example of a computing environment that can implement determination of a location of a mobile device in accordance with one or more embodiments of the disclosure.

In order to provide additional context for various aspects of this disclosure, FIG. 9 and the following discussion are intended to provide a brief, general description of a suitable example computing environment 900 in which the various aspects of the specification can be implemented. Example computing environment 900 can embody several of the components or layers described herein. In addition, example computing environment 900 can execute or otherwise implement components, or portions thereof, implemented as software application(s) or firmware applications(s). Memory elements that are part of computing environment 900 can embody or can constitute various data stores described in the one or more embodiments of the subject disclosure. While the specification has been described above in the general context of computer-executable instructions that may run on one or more computers, those skilled in the art will recognize that the specification also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the specification may also be practiced in distributed computing environments where certain tasks are performed by remote processing devices that are linked through a communications network. In a distributed computing environment, program modules can be located in both local and remote memory storage devices.

A computer typically includes a variety of computer-readable storage devices. Computer-readable storage device can include computer-readable storage media embodied in or including any available media that can be accessed by the computer and includes both volatile and nonvolatile media, removable and non-removable media. By way of example, and not limitation, computer-readable media can comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

With further reference to FIG. 9, the example environment 900 for implementing various aspects of the specification includes a computing device 902. In certain embodiments, the computing device 1902 can embody or can constitute the location monitoring system 120. In other embodiments, the example computing environment 1900 can embody or can constitute a combination of systems and component(s) thereof in accordance with aspects of this disclosure. In other embodiments, the computing device 1902 can embody or can constitute the mobile device 160. As illustrated, the computing device 902 includes a processing unit 904, a system memory 906 and a system bus 908. The system bus 908 couples system components including, but not limited to, the system memory 906 to the processing unit 904. The processing unit 904 can be any of various commercially available processors. Dual microprocessors and other multi-processor architectures may also be employed as the processing unit 904.

The system bus 908 can be any of several types of bus structure that may further interconnect to a memory bus (with or without a memory controller), a peripheral bus, and a local bus using any of a variety of commercially available bus architectures. The system memory 906 includes read-only memory (ROM) 910 and random access memory (RAM) 912. A basic input/output system (BIOS) is stored in a non-volatile memory 910 such as ROM, EPROM, EEPROM, which BIOS contains the basic routines that help to transfer information between elements within the computing device 902, such as during start-up. The RAM 912 can also include a high-speed RAM such as static RAM for caching data.

The computing device 902 further includes an internal hard disk drive (HDD) 914 (e.g., EIDE, SATA), which internal hard disk drive 914 may also be configured for external use in a suitable chassis (not shown), or an external HDD 915 can be present in addition to internal HDD 914, a magnetic floppy disk drive (FDD) 916, (e.g., to read from or write to a removable diskette 918) and an optical disk drive 920, (e.g., reading a CD-ROM disk 922 or, to read from or write to other high capacity optical media such as the DVD). The hard disk drive 914, magnetic disk drive 916 and optical disk drive 920 can be connected to the system bus 908 by a hard disk drive interface 924, a magnetic disk drive interface 926 and an optical drive interface 928, respectively. The interface 924 for external drive implementations includes at least one or both of Universal Serial Bus (USB) and IEEE 1394 interface technologies. Other external drive connection technologies are within contemplation of the subject specification.

The drives and their associated computer-readable media provide nonvolatile storage of data, data structures, computer-executable instructions, and so forth. For the computing device 902, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the example operating environment, and further, that any such media may contain computer-executable instructions for performing the methods of the specification.

A number of program modules can be stored in the drives and RAM 912, including an operating system 930, one or more application programs 932, other program modules 934 and program data 936. All or portions of the operating system, applications, modules, and/or data can also be cached in the RAM 912. It is appreciated that the specification can be implemented with various commercially available operating systems or combinations of operating systems. At least one of the program modules 934 can include, for example, computer-accessible instructions (e.g., computer-executable instructions and/or computer-readable instructions) that, in response to execution by the processing unit 904, can permit the computing device 902 and/or one or more of the remote computer(s) 948 to perform or otherwise facilitate performance of operations that provide the functionalities described herein in accordance with embodiments of this disclosure, such as implementing one or more of the example methods shown in FIGS. 7-8. In certain implementations, such computer-accessible instructions also can be executed by another processing unit (such as a processor in one of the remote computer(s) 948) in order to implement various functionalities in accordance with aspects of this disclosure. At least a portion of the program data 936 can be utilized or otherwise leveraged during execution of one or more of the program modules 934 in order for the computing device 902 to operate in accordance with aspects described herein in accordance with embodiments of this disclosure.

An end-user can enter commands and information into the computing device 902 through one or more wired/wireless input devices, e.g., a keyboard 938 and a pointing device, such as a mouse 940. Other input devices (not shown) may include a microphone, an IR remote control, a joystick, a game pad, a stylus pen, touch screen, or the like. These and other input devices are often connected to the processing unit 904 through an input device interface 942 that is coupled to the system bus 908, but can be connected by other interfaces, such as a parallel port, an IEEE 1394 serial port, a game port, a USB port, an IR interface, etc.

A monitor 944 or other type of display device is also connected to the system bus 908 via an interface, such as a video adapter 946. In addition to the monitor 944, a computer typically includes other peripheral output devices (not shown), such as speakers, printers, etc.

The computing device 902 may operate in a networked environment using logical connections via wired and/or wireless communications to one or more remote computers, such as a remote computer(s) 948. The remote computer(s) 948 can be a workstation, a server computer, a router, a personal computer, portable computer, microprocessor-based entertainment appliance, a peer device or other common network node, and typically includes many or all of the elements described relative to the computing device 902, although, for purposes of brevity, only a memory/storage device 950 is illustrated. The logical connections depicted include wired/wireless connectivity to a local area network (LAN) 952 and/or larger networks, e.g., a wide area network (WAN) 954. Such LAN and WAN networking environments are commonplace in offices and companies, and facilitate enterprise-wide computer networks, such as intranets, all of which may connect to a global communications network, e.g., the Internet.

When used in a LAN networking environment, the computing device 902 is connected to the local network 952 through a wired and/or wireless communication network interface or adapter 956. The adapter 956 may facilitate wired or wireless communication to the LAN 952, which may also include a wireless access point disposed thereon for communicating with the wireless adapter 956.

When used in a WAN networking environment, the computing device 902 can include a modem 958, or is connected to a communications server on the WAN 954, or has other means for establishing communications over the WAN 954, such as by way of the Internet. The modem 958, which can be internal or external and a wired or wireless device, is connected to the system bus 908 via the serial port interface 942. In a networked environment, program modules depicted relative to the computing device 902, or portions thereof, can be stored in the remote memory/storage device 950. It will be appreciated that the network connections shown are example and other means of establishing a communications link between the computers can be used.

The computing device 902 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks can operate in the unlicensed 2.4 and 5 GHz radio bands, at a 9 Mbps (802.11a) or 54 Mbps (802.11b) data rate, for example, or with products that contain both bands (dual band), so the networks can provide real-world performance similar to the basic 10BaseT wired Ethernet networks used in many offices.

Figure 10:
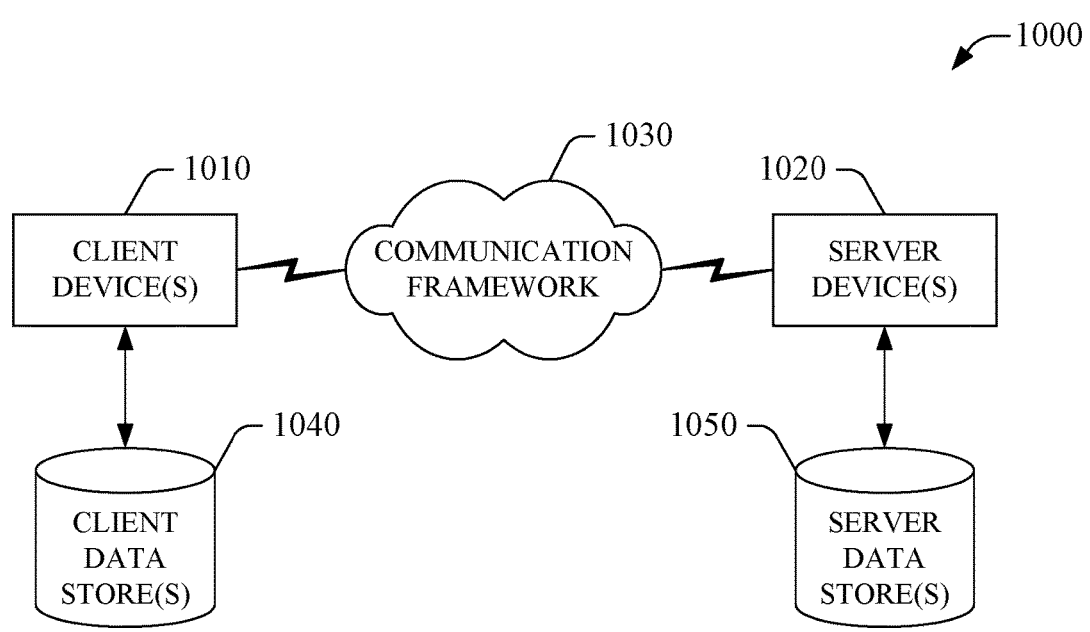
FIG. 10 presents another example of a computing environment in accordance with one or more embodiments of the disclosure.

FIG. 10 illustrates a schematic block diagram of an example computing environment 1030, in accordance with aspects described herein. The system 1000 includes one or more client(s) 1010. The client(s) 1010 can be hardware and/or software (e.g., threads, processes, computing devices). The system 1000 also includes one or more server(s) 1020. Thus, system 1000 can correspond to a two-tier client server model or a multi-tier model (e.g., client, middle tier server, data server), amongst other models. The server(s) 1020 can also be hardware and/or software (e.g., threads, processes, computing devices). The servers 1020 can house threads to perform transformations by employing the subject disclosure, for example. One possible communication between a client 1010 and a server 1020 may be in the form of a data packet transmitted between two or more computer processes.

The system 1000 includes a communication framework 1030 that can be employed to facilitate communications between the client(s) 1010 and the server(s) 1020. The client(s) 1010 are operatively connected to one or more client data store(s) 1040 that can be employed to store information local to the client(s) 1010. Similarly, the server(s) 1020 are operatively connected to one or more server data store(s) 1050 that can be employed to store information local to the servers 1020.

In the present description, for purposes of explanation, numerous specific details have been set forth in order to provide a thorough understanding of the disclosure. It may be evident, however, that the subject disclosure may be practiced without these specific details. In other instances, well-known structures and devices are shown in block diagram form in order to facilitate describing the subject disclosure.

As used in this disclosure, including the annexed drawings, the terms "component," "system," "platform," "unit," "function," "interface," and the like are intended to refer to a computer-related entity or an entity related to an operational apparatus with one or more specific functionalities, wherein the entity can be either hardware, a combination of hardware and software, software, or software in execution. One or more of such entities are also referred to as "functional elements." As an example, a component may be, but is not limited to being, a process running on a processor, a processor, an object, an executable, a thread of execution, a program, and/or a computer. By way of illustration, both an application running on a server or network controller, and the server or network controller can be a component. One or more components may reside within a process and/or thread of execution and a component may be localized on one computer and/or distributed between two or more computers. Also, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software, or firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that provides at least in part the functionality of the electronic components. As further yet another example, interface(s) can include input/output (I/O) components as well as associated processor, application, or Application Programming Interface (API) components. While the foregoing examples are directed to aspects of a component, the exemplified aspects or features also apply to a system, platform, interface, node, coder, decoder, and the like.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

Moreover, terms like "user equipment," "mobile station," "mobile," subscriber station," "subscriber equipment," "access terminal," "handset," and similar terminology, refer to a wireless device utilized by a subscriber or user of a wireless communication service to receive or convey data, control, voice, video, sound, gaming, or substantially any data-stream or signaling-stream. The foregoing terms are utilized interchangeably in the subject specification and related drawings.

Furthermore, the terms "user," "subscriber," "customer," "consumer," "prosumer," "agent," and the like are employed interchangeably throughout the subject specification, unless context warrants particular distinction(s) among the terms. It should be appreciated that such terms can refer to human entities or automated components supported through artificial intelligence (e.g., a capacity to make inference based on complex mathematical formalisms) which can provide simulated vision, sound recognition and so forth.

The term "processor," as utilized in this disclosure, can refer to any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

In addition, terms such as "store," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can include both volatile and nonvolatile memory. Moreover, a memory component can be removable or affixed to a functional element (e.g., device, server).

By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Various embodiments described herein can be implemented as a method, apparatus, or article of manufacture using standard programming and/or engineering techniques. In addition, various of the aspects disclosed herein also can be implemented through program modules stored in a memory and executed by a processor, or other combination of hardware and software, or hardware and firmware. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical discs (e.g., compact disc (CD), digital versatile disc (DVD), blu-ray disc (BD) . . . ), smart cards, and flash memory devices (e.g., card, stick, key drive . . . ).

What has been described above includes examples of systems and methods that provide advantages of the subject disclosure. It is, of course, not possible to describe every conceivable combination of components or methodologies for purposes of describing the subject disclosure, but one of ordinary skill in the art may recognize that many further combinations and permutations of the claimed subject matter are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

What is claimed is:
1. A system, comprising:
a processor; and
a memory that stores executable instructions that, when executed by the processor, facilitate performance of operations, comprising:
facilitating an exchange of information between a mobile device and a serving mobile location center device of a communication network, wherein the exchange of information generates data representative of a location of the mobile device;

updating a location record, associated with the mobile device, to include the data representative of the location of the mobile device, wherein the location record is stored by a storage device of the communication network; and in response to a request for a current location of the mobile device, determining an estimate of the current location based on the location of the mobile device and the location record, wherein a call session is not established with the mobile device during the determining the estimate of the current location.

2. The system of claim 1, wherein the operations further comprise, prior to the facilitating the exchange of information:

facilitating sending an instruction to the mobile device to perform a location update; and receiving information indicative of the location update from the mobile device, wherein the information indicative of the location update comprises the data representative of the location of the mobile device.

3. The system of claim 1, wherein the facilitating the exchange of information is in response to a determination of acceptance of an authorization configuration associated with tracking the location of the mobile device.

4. The system of claim 3, wherein the determination of the acceptance of the authorization configuration comprises accessing opt-in information indicative of a permission to monitor the location of the mobile device, and wherein the opt-in information is stored by a server device of the communication network.

5. The system of claim 3, wherein the data representative of the location of the mobile device comprises a geographic coordinate associated with the mobile device, and wherein the determining the estimate of the current location of the mobile device comprises assigning the geographic coordinate to the estimate of the current location.

6. The system of claim 3, wherein the data representative of the location of the mobile device comprises distance information related to a distance between the mobile device and a network device of the communication network, and wherein the determining the estimate of the current location of the mobile device comprises using a trilateration process based on the distance information.

7. The system of claim 6, wherein the distance information comprises timing information that represents the distance between the mobile device and the network device.

8. The system of claim 1, wherein the data representative of the location is stored by the storage device in connection with a process of locating the mobile device during an emergency situation.

9. The system of claim 1, wherein the mobile device is a first mobile device, and wherein the operations further comprise:

prior to the determining the estimate of the current location of the first mobile device, receiving a first text message representative of a location request for the current location, wherein the first text message is received from a second mobile device.

10. The system of claim 9, wherein the operations further comprise:

in response to the request for the current location, determining an absence of an acceptance of an authorization configuration associated with tracking the location of the mobile device, wherein the absence of the acceptance comprises opt-out information stored in a device profile associated with the mobile device; and facilitating a modification of the device profile to permit a determination of the current location based on the request for the current location being an authorized request.

11. A method, comprising:

facilitating, by a network device of a communication network, the network device comprising a processor, a transmission of a message to a mobile device for an indication of a first location of the mobile device;

in response to receiving, by the network device, the indication of the first location from the mobile device, updating a location record for the mobile device, wherein the indication of the first location is based on a result of a communication exchange between the mobile device and a serving mobile location center device of the communication network; and determining, by the network device, a second location of the mobile device based on the indication of the first location and the location record for the mobile device, wherein a communication session is not established with the mobile device during the determining the second location.

12. The method of claim 11, wherein the mobile device is a first mobile device, wherein the message is a first message, wherein the communication session is a first communication session, and wherein the method further comprises:

prior to determining the second location, receiving, by the network device, a second message, from a second mobile device, that indicates a request for the second location of the first mobile device, and wherein a second communication session between the first mobile device and the second mobile device is disabled.

13. The method of claim 12, further comprising:

in response to the second message from the second mobile device, determining, by the network device, that an opt-out notification is retained in a device profile associated with the first mobile device; and facilitating, by the network device, a modification of the device profile to allow a determination of the second location of the first mobile device, wherein the facilitating the modification comprises implementing an exception handling process.

14. The method of claim 12, further comprising:

in response to the second message from the second mobile device, determining, by the network device, that opt-in information indicative of a permission to monitor the second location of the first mobile device is retained in a device profile associated with the first mobile device.

15. The method of claim 11, wherein the indication of the first location of the mobile device comprises a geographic coordinate associated with the mobile device, and wherein the determining the second location of the mobile device comprises assigning the geographic coordinate to an estimate of the second location.

16. The method of claim 11, wherein the indication of the first location of the mobile device comprises distance information related to a distance between the mobile device and the network device, and wherein the determining the second location of the mobile device comprises using a trilateration process based on the distance information.

17. The method of claim 16, wherein the distance information comprises timing information that represents the distance between the mobile device and the network device.

18. A non-transitory machine-readable medium, comprising executable instructions that, when executed by a processor, facilitate performance of operations, comprising:
    facilitating an information exchange between a mobile device and a network device of a communication network, wherein the information exchange generates data representative of a first location of the mobile device;
    updating a location record of the mobile device to include the data representative of the first location of the mobile device, wherein the location record is retained in a storage device of the communication network; and
    determining an estimate of a second location of the mobile device in response to a request for the second location, wherein the estimate of the second location is based on the first location and the location record, and wherein a communication session is not established with the mobile device during the determining the estimate of the second location.

19. The non-transitory machine-readable medium of claim 18, wherein the operations further comprise:
    in response to the request for the second location, determining an absence of authorization information associated with monitoring the second location of the mobile device, wherein the absence of the authorization information comprises opt-out information stored in a device profile associated with the mobile device; and
    facilitating a modification of the device profile to permit a determination of the second location based on the request for the second location being an authorized request.

20. The non-transitory machine-readable medium of claim 19, wherein the operations further comprise:
    implementing an exception handling process that overrides the opt-out information and modifies the authorization information present in the device profile associated with the mobile device.

* * * * *